United States Patent
Leary et al.

(10) Patent No.: US 10,605,096 B2
(45) Date of Patent: Mar. 31, 2020

(54) FLARED CENTRAL CAVITY AFT OF AIRFOIL LEADING EDGE

(71) Applicant: General Electric Company, Schenectady, NY (US)

(72) Inventors: Brendon James Leary, Simpsonville, SC (US); Gregory Thomas Foster, Greer, SC (US); Michelle Jessica Iduate, Simpsonville, SC (US); David Wayne Weber, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 886 days.

(21) Appl. No.: 15/152,690

(22) Filed: May 12, 2016

(65) Prior Publication Data

US 2017/0328218 A1    Nov. 16, 2017

(51) Int. Cl.
   *F01D 5/18*    (2006.01)
   *F01D 9/04*    (2006.01)

(52) U.S. Cl.
   CPC .............. *F01D 5/187* (2013.01); *F01D 9/041* (2013.01); *F05D 2240/121* (2013.01); *F05D 2240/303* (2013.01); *F05D 2250/18* (2013.01); *F05D 2260/201* (2013.01); *F05D 2260/202* (2013.01); *F05D 2260/22141* (2013.01); *Y02T 50/676* (2013.01)

(58) Field of Classification Search
   None
   See application file for complete search history.

(56) References Cited

U.S. PATENT DOCUMENTS

| | | | |
|---|---|---|---|
| 9,115,590 B2 * | 8/2015 | Spangler | F01D 5/18 |
| 9,605,544 B2 * | 3/2017 | Tibbott | F01D 5/18 |
| 2014/0127013 A1 * | 5/2014 | Spangler | F01D 5/18 416/1 |
| 2015/0044029 A1 * | 2/2015 | Tibbott | F01D 5/18 415/115 |
| 2015/0184519 A1 | 7/2015 | Foster et al. | |

* cited by examiner

*Primary Examiner* — Igor Kershteyn
*Assistant Examiner* — Juan G Flores
(74) *Attorney, Agent, or Firm* — Dale Davis; Hoffman Warnick LLC

(57) ABSTRACT

A blade includes an airfoil defined by a pressure side outer wall and a suction side outer wall connecting along leading and trailing edges and form a radially extending chamber for receiving a coolant flow. A rib configuration may include: a leading edge transverse rib connecting the pressure side outer wall and the suction side outer wall and partitioning the radially extending chamber into a leading edge passage within the leading edge of the airfoil and a central passage adjacent to the leading edge passage. One or both camber line ribs connect to a corresponding pressure side outer wall and suction side outer wall at a point aft of the leading edge transverse rib causing the central passage to extend towards one or both of the pressure side outer wall and the suction side outer wall, resulting in a flared center cavity aft of the leading edge.

9 Claims, 10 Drawing Sheets

FLARED CENTRAL CAVITY AFT OF AIRFOIL LEADING EDGE

BACKGROUND OF THE INVENTION

This disclosure relates to turbine airfoils, and more particularly to hollow turbine airfoils, such as rotor or stator blades, having internal channels for passing fluids such as air to cool the airfoils.

Combustion or gas turbine engines (hereinafter "gas turbines") include a compressor, a combustor, and a turbine. As is well known in the art, air compressed in the compressor is mixed with fuel and ignited in the combustor and then expanded through the turbine to produce power. The components within the turbine, particularly the circumferentially arrayed rotor and stator blades, are subjected to a hostile environment characterized by the extremely high temperatures and pressures of the combustion products that are expended therethrough. In order to withstand the repetitive thermal cycling as well as the extreme temperatures and mechanical stresses of this environment, the airfoils must have a robust structure and be actively cooled.

As will be appreciated, turbine rotor and stator blades often contain internal passageways or circuits that form a cooling system through which a coolant, typically air bled from the compressor, is circulated. Such cooling circuits are typically formed by internal ribs that provide the required structural support for the airfoil, and include multiple flow path arrangements to maintain the airfoil within an acceptable temperature profile. The air passing through these cooling circuits often is vented through film cooling apertures formed on the leading edge, trailing edge, suction side, and pressure side of the airfoil.

It will be appreciated that the efficiency of gas turbines increases as firing temperatures rise. Because of this, there is a constant demand for technological advances that enable turbine blades to withstand ever higher temperatures. These advances sometimes include new materials that are capable of withstanding the higher temperatures, but just as often they involve improving the internal configuration of the airfoil so to enhance the blades structure and cooling capabilities. However, because the use of coolant decreases the efficiency of the engine, new arrangements that rely too heavily on increased levels of coolant usage merely trade one inefficiency for another. As a result, there continues to be demand for new airfoil arrangements that offer internal airfoil configurations and coolant circulation that improves coolant efficiency.

A consideration that further complicates arrangement of internally cooled airfoils is the temperature differential that develops during operation between the airfoils internal and external structure. That is, because they are exposed to the hot gas path, the external walls of the airfoil typically reside at much higher temperatures during operation than many of the internal ribs, which, for example, may have coolant flowing through passageways defined to each side of them. In fact, a common airfoil configuration includes a "four-wall" arrangement in which lengthy inner ribs run parallel to the pressure and suction side outer walls. It is known that high cooling efficiency can be achieved by the near-wall flow passages that are formed in the four-wall arrangement. A challenge with the near-wall flow passages is that the outer walls experience a significantly greater level of thermal expansion than the inner walls. This imbalanced growth causes stress to develop at the points at which the inner ribs connect, which may cause low cyclic fatigue that can shorten the life of the blade.

BRIEF DESCRIPTION OF THE INVENTION

A first aspect of the disclosure provides a blade comprising an airfoil defined by a concave pressure side outer wall and a convex suction side outer wall that connect along leading and trailing edges and, therebetween, form a radially extending chamber for receiving the flow of a coolant, the blade further comprising: a rib configuration including: a leading edge transverse rib connecting the pressure side outer wall and the suction side outer wall and partitioning the radially extending chamber into a leading edge passage within the leading edge of the airfoil and a central passage adjacent to the leading edge passage, and a camber line rib connecting to a selected one of the pressure side outer wall and the suction side outer wall at a point aft of the leading edge transverse rib causing the central passage to extend towards the selected one of the pressure side outer wall and the suction side outer wall.

A second aspect of the disclosure provides a turbine rotor blade comprising an airfoil defined by a concave pressure side outer wall and a convex suction side outer wall that connect along leading and trailing edges and, therebetween, form a radially extending chamber for receiving the flow of a coolant, the turbine rotor blade further comprising: a rib configuration including: a leading edge transverse rib connecting the pressure side outer wall and the suction side outer wall and partitioning the radially extending chamber into a leading edge passage within the leading edge of the airfoil and a central passage adjacent to the leading edge passage, and a camber line rib connecting to a selected one of the pressure side outer wall and the suction side outer wall at a point aft of the leading edge transverse rib causing the central passage to extend towards the selected one of the pressure side outer wall and the suction side outer wall.

The illustrative aspects of the present disclosure are arrangements to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
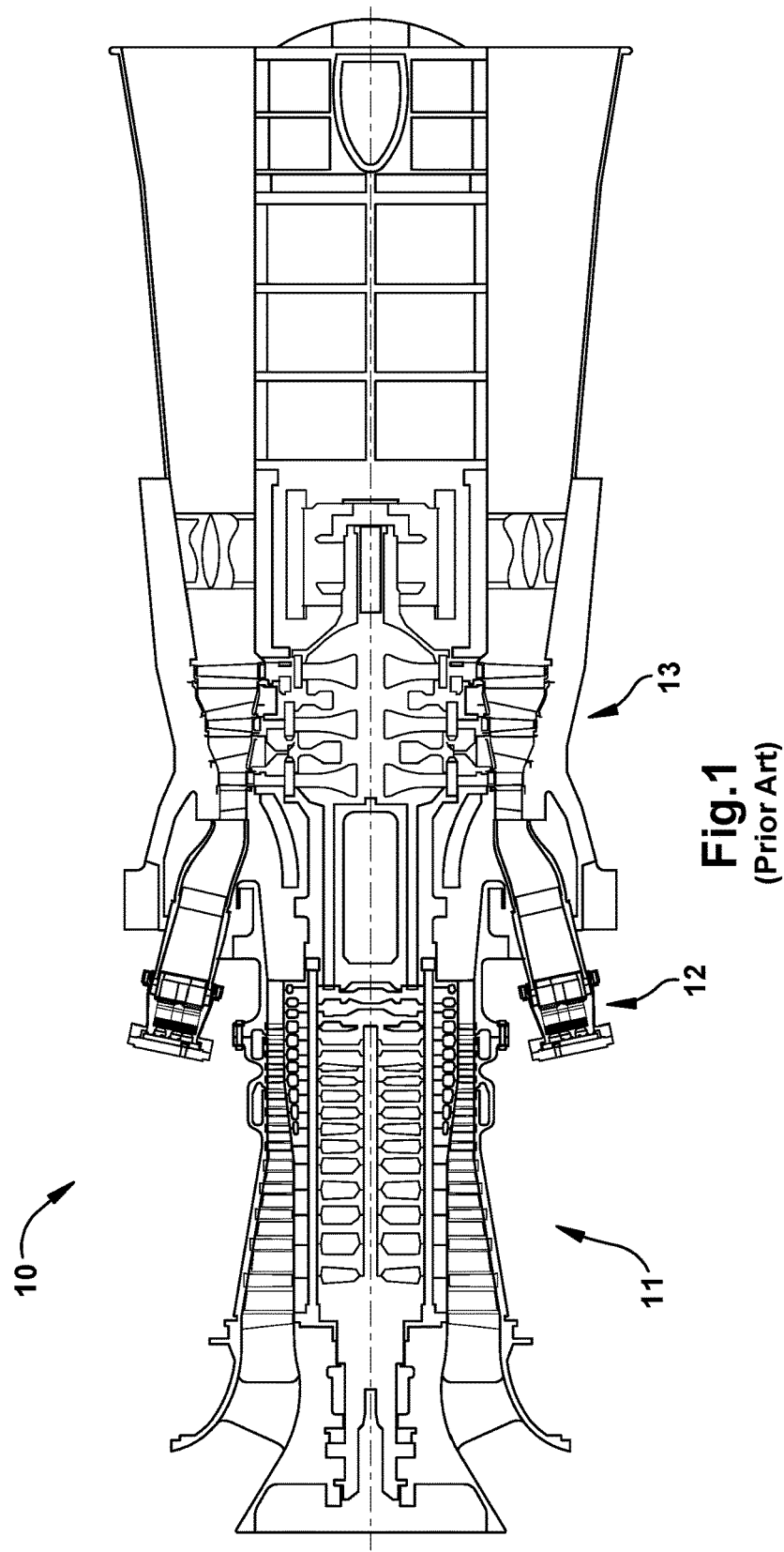
FIG. 1 is a schematic representation of an example turbine engine in which certain embodiments of the present application may be used.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As an initial matter, in order to clearly describe the current disclosure it will become necessary to select certain terminology when referring to and describing relevant machine components within a gas turbine. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow. The terms "forward" and "aft", without any further specificity, refer to directions, with "forward" referring to the front or compressor end of the engine, and "aft" referring to the rearward or turbine end of the engine. It is often required to describe parts that are at differing radial positions with regard to a center axis. The term "radial" refers to movement or position perpendicular to an axis. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

By way of background, referring now to the figures, FIGS. 1 through 4 illustrate an example combustion turbine engine in which embodiments of the present application may be used. It will be understood by those skilled in the art that the present disclosure is not limited to this particular type of usage. The present disclosure may be used in combustion turbine engines, such as those used in power generation, airplanes, as well as other engine or turbomachine types. The examples provided are not meant to be limiting unless otherwise stated.

FIG. 1 is a schematic representation of a combustion turbine engine 10. In general, combustion turbine engines operate by extracting energy from a pressurized flow of hot gas produced by the combustion of a fuel in a stream of compressed air. As illustrated in FIG. 1, combustion turbine engine 10 may be configured with an axial compressor 11 that is mechanically coupled by a common shaft or rotor to a downstream turbine section or turbine 13, and a combustor 12 positioned between compressor 11 and turbine 13.

Figure 2:
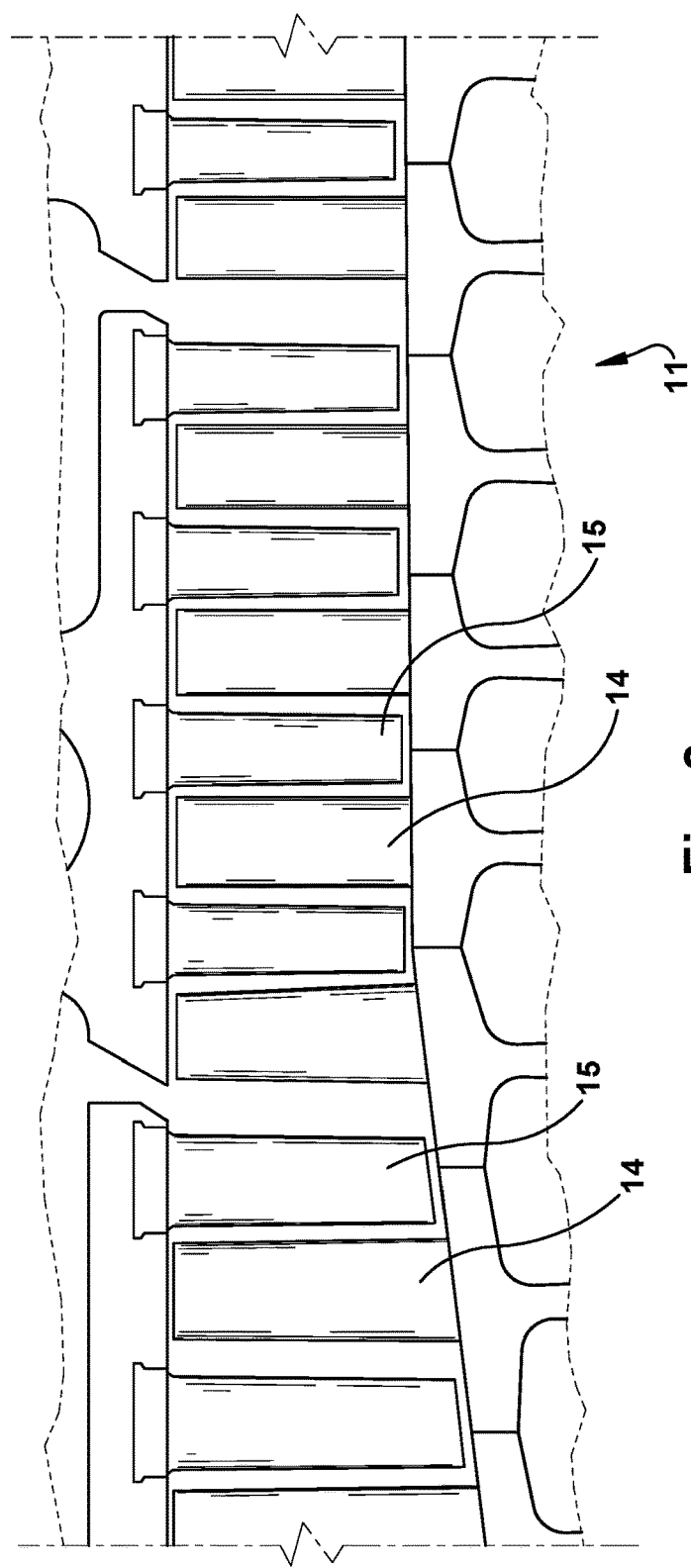
FIG. 2 is a sectional view of the compressor section of the combustion turbine engine of FIG. 1.

FIG. 2 illustrates a view of an illustrative multi-staged axial compressor 11 that may be used in the combustion turbine engine of FIG. 1. As shown, compressor 11 may include a plurality of stages. Each stage may include a row of compressor rotor blades 14 followed by a row of compressor stator blades 15. Thus, a first stage may include a row of compressor rotor blades 14, which rotate about a central shaft, followed by a row of compressor stator blades 15, which remain stationary during operation.

Figure 3:
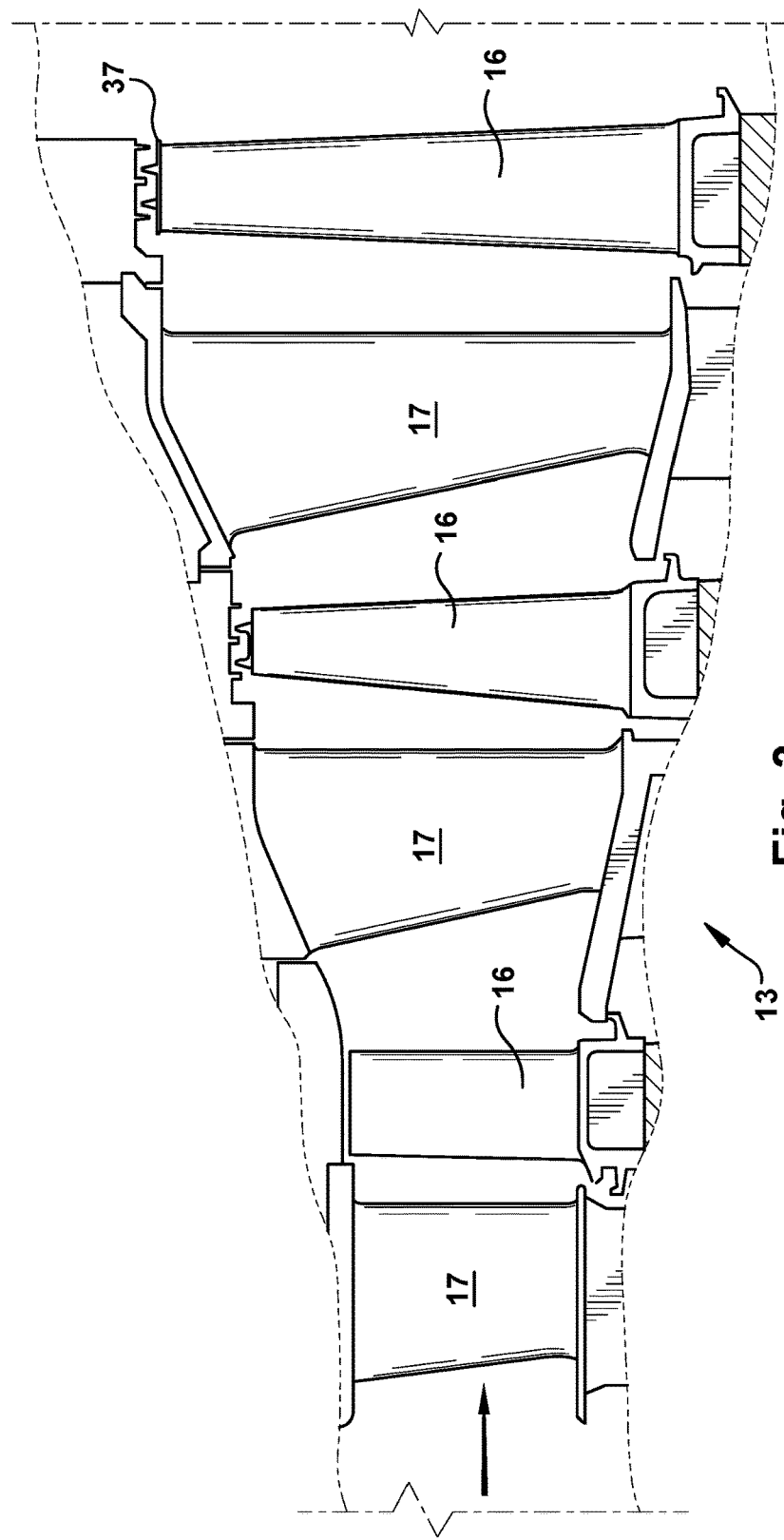
FIG. 3 is a sectional view of the turbine section of the combustion turbine engine of FIG. 1.

FIG. 3 illustrates a partial view of an illustrative turbine section or turbine 13 that may be used in the combustion turbine engine of FIG. 1. Turbine 13 may include a plurality of stages. Three illustrative stages are shown, but more or less stages may be present in the turbine 13. A first stage includes a plurality of turbine buckets or turbine rotor blades 16, which rotate about the shaft during operation, and a plurality of nozzles or turbine stator blades 17, which remain stationary during operation. Turbine stator blades 17 generally are circumferentially spaced one from the other and fixed about the axis of rotation. Turbine rotor blades 16 may be mounted on a turbine wheel (not shown) for rotation about the shaft (not shown). A second stage of turbine 13 also is illustrated. The second stage similarly includes a plurality of circumferentially spaced turbine stator blades 17 followed by a plurality of circumferentially spaced turbine rotor blades 16, which are also mounted on a turbine wheel for rotation. A third stage also is illustrated, and similarly includes a plurality of turbine stator blades 17 and rotor blades 16. It will be appreciated that turbine stator blades 17 and turbine rotor blades 16 lie in the hot gas path of the turbine 13. The direction of flow of the hot gases through the hot gas path is indicated by the arrow. As one of ordinary skill in the art will appreciate, turbine 13 may have more, or in some cases less, stages than those that are illustrated in FIG. 3. Each additional stage may include a row of turbine stator blades 17 followed by a row of turbine rotor blades 16.

In one example of operation, the rotation of compressor rotor blades 14 within axial compressor 11 may compress a flow of air. In combustor 12, energy may be released when the compressed air is mixed with a fuel and ignited. The resulting flow of hot gases from combustor 12, which may be referred to as the working fluid, is then directed over turbine rotor blades 16, the flow of working fluid inducing the rotation of turbine rotor blades 16 about the shaft. Thereby, the energy of the flow of working fluid is transformed into the mechanical energy of the rotating blades and, because of the connection between the rotor blades and the shaft, the rotating shaft rotates. The mechanical energy of the shaft may then be used to drive the rotation of the compressor rotor blades 14, such that the necessary supply of compressed air is produced, and also, for example, a generator to produce electricity.

Figure 4:
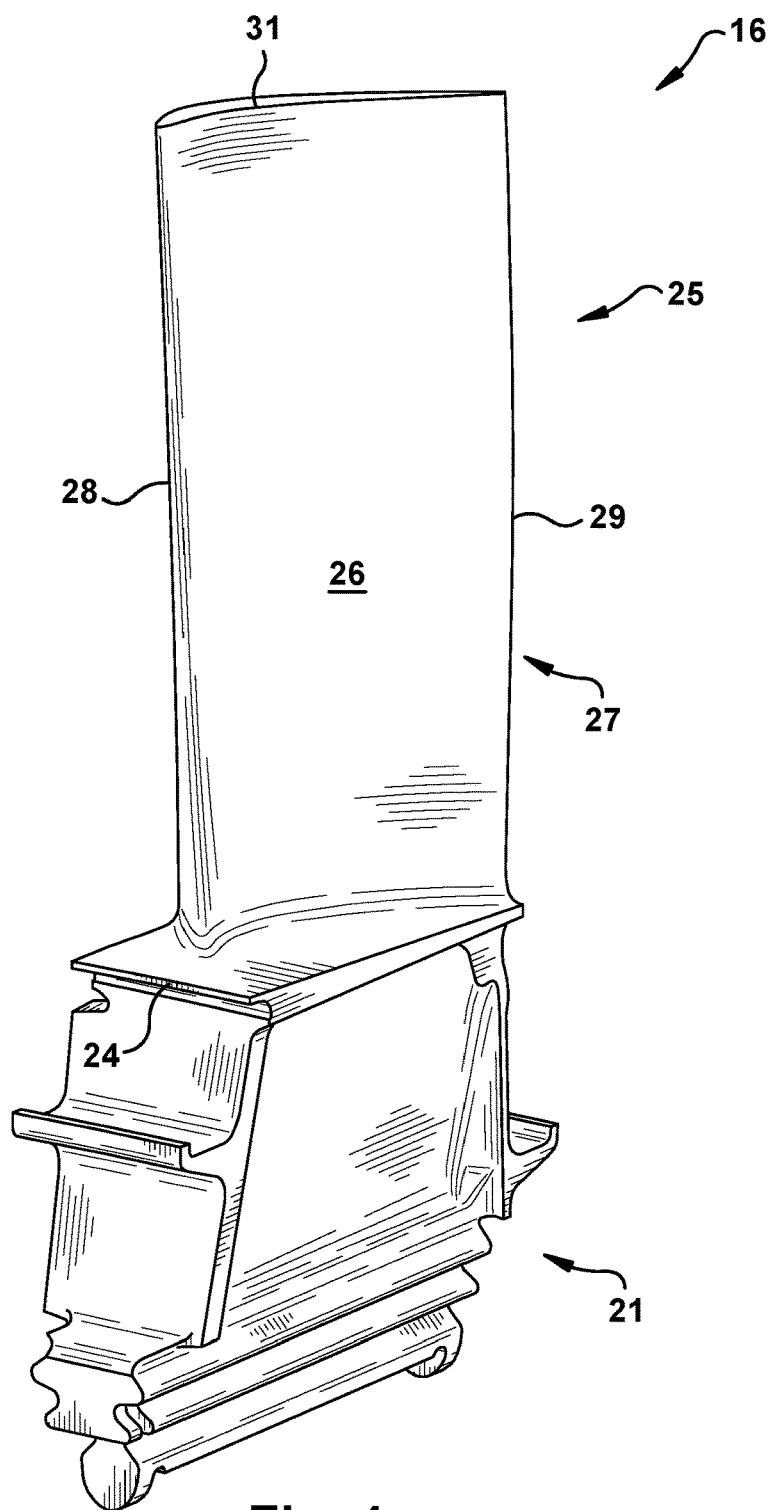
FIG. 4 is a perspective view of a turbine rotor blade of the type in which embodiments of the present disclosure may be employed.

FIG. 4 is a perspective view of a turbine rotor blade 16 of the type in which embodiments of the present disclosure may be employed. Turbine rotor blade 16 includes a root 21 by which rotor blade 16 attaches to a rotor disc. Root 21 may include a dovetail configured for mounting in a corresponding dovetail slot in the perimeter of the rotor disc. Root 21 may further include a shank that extends between the dovetail and a platform 24, which is disposed at the junction of airfoil 25 and root 21 and defines a portion of the inboard boundary of the flow path through turbine 13. It will be appreciated that airfoil 25 is the active component of rotor blade 16 that intercepts the flow of working fluid and induces the rotor disc to rotate. While the blade of this example is a turbine rotor blade 16, it will be appreciated that the present disclosure also may be applied to other types of blades within turbine engine 10, including turbine stator blades 17 (vanes). It will be seen that airfoil 25 of rotor blade 16 includes a concave pressure side (PS) outer wall 26 and a circumferentially or laterally opposite convex suction side (SS) outer wall 27 extending axially between opposite leading and trailing edges 28, 29 respectively. Sidewalls 26 and 27 also extend in the radial direction from platform 24 to an outboard tip 31. (It will be appreciated that the application of the present disclosure may not be limited to turbine rotor blades, but may also be applicable to stator blades. The usage of rotor blades in the several embodiments described herein is illustrative unless otherwise stated.)

Figure 5:
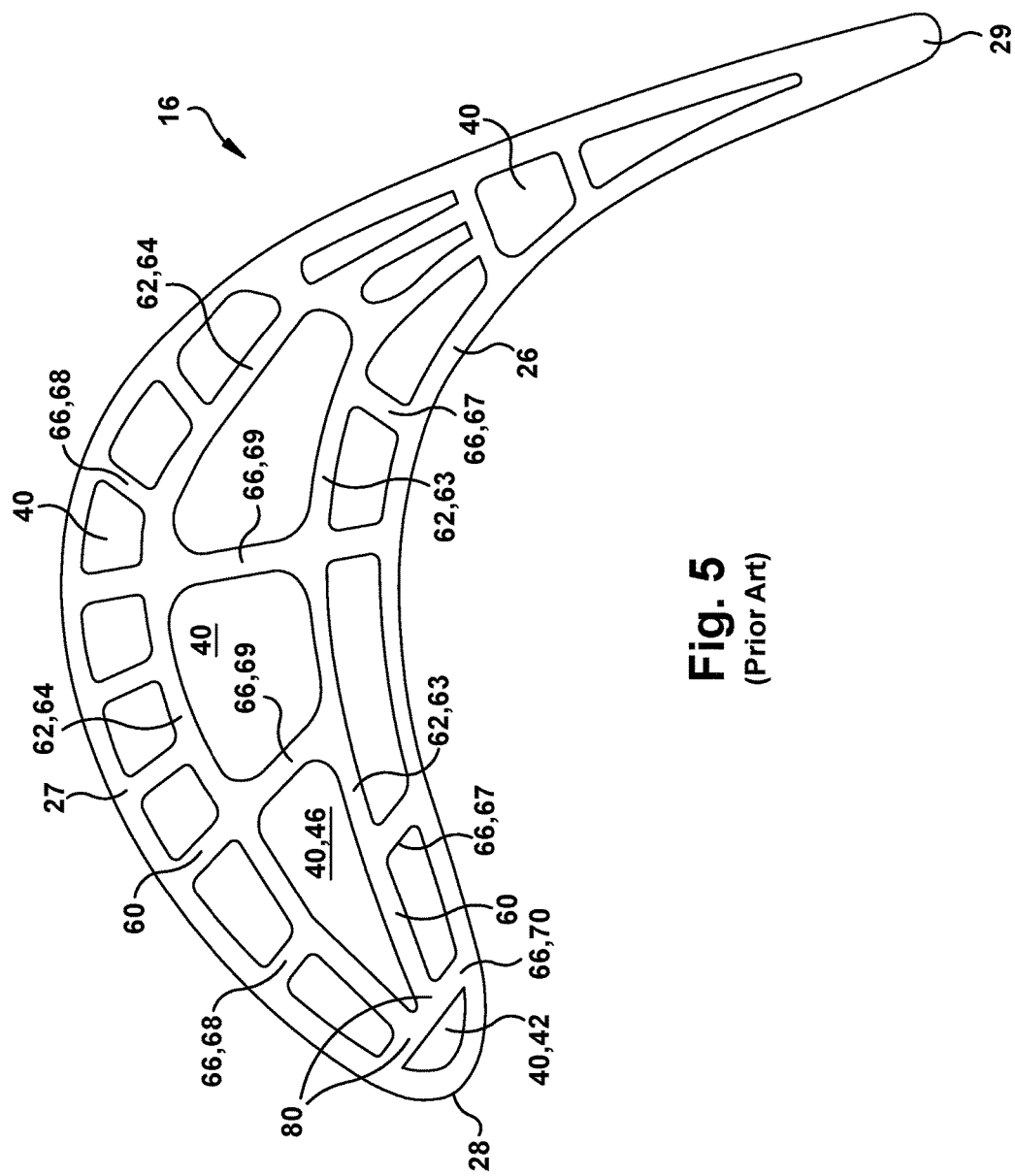
FIG. 5 is a cross-sectional view of a turbine rotor blade having an inner wall or rib configuration according to conventional arrangement.
Figure 6:
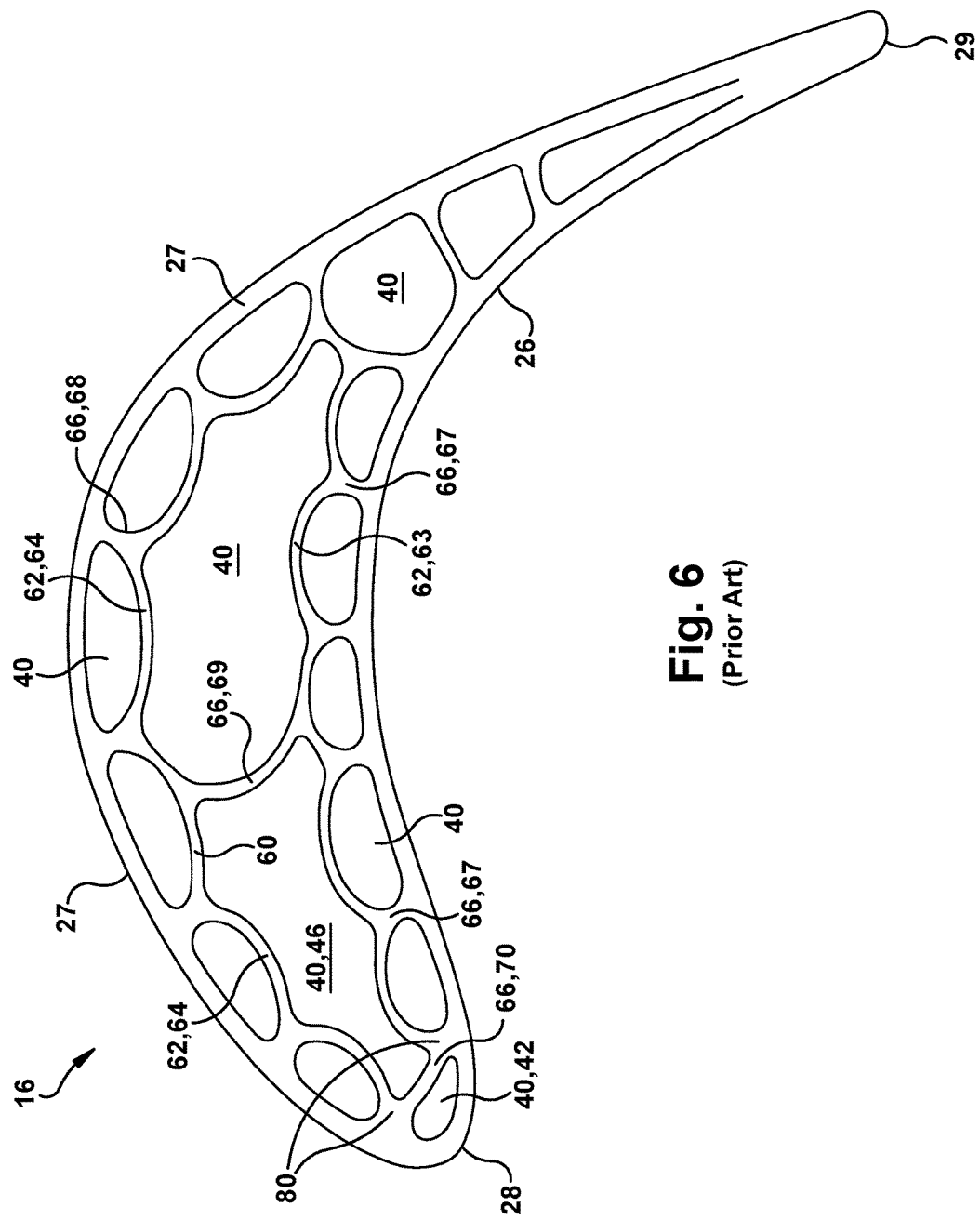
FIG. 6 is a cross-sectional view of a turbine rotor blade having an inner wall configuration according to conventional arrangement.

FIGS. 5 and 6 show two example internal wall constructions as may be found in a rotor blade airfoil 25 having a conventional arrangement. As indicated, an outer surface of airfoil 25 may be defined by a relatively thin pressure side (PS) outer wall 26 and suction side (SS) outer wall 27, which may be connected via a plurality of radially extending and intersecting ribs 60. Ribs 60 are configured to provide structural support to airfoil 25, while also defining a plurality of radially extending and substantially separated flow passages 40. Typically, ribs 60 extend radially so to partition flow passages 40 over much of the radial height of airfoil 25, but the flow passage may be connected along the periphery of the airfoil so to define a cooling circuit. That is, flow passages 40 may fluidly communicate at the outboard or inboard edges of airfoil 25, as well as via impingement apertures (latter not shown) that may be positioned therebetween. In this manner certain of flow passages 40 together may form a winding or serpentine cooling circuit. Additionally, film cooling ports (not shown) may be included that provide outlets through which coolant is released from flow passages 40 onto outer surface of airfoil 25.

Ribs 60 may include two different types, which then, as provided herein, may be subdivided further. A first type, a camber line rib 62, is typically a lengthy rib that extends in parallel or approximately parallel to the camber line of the airfoil, which is a reference line stretching from a leading edge 28 to a trailing edge 29 that connects the midpoints between pressure side outer wall 26 and suction side outer wall 27. As is often the case, the illustrative conventional configuration of FIGS. 5 and 6 include two camber line ribs 62, a pressure side camber line rib 63, which also may be referred to as the pressure side outer wall given the manner in which it is offset from and close to the pressure side outer wall 26, and a suction side camber line rib 64, which also may be referred to as the suction side outer wall given the manner in which it is offset from and close to the suction side outer wall 27. As mentioned, these types of arrangements are often referred to as having a "four-wall" configuration due to the prevalent four main walls that include two outer walls 26, 27 and two camber line ribs 63, 64. It will be appreciated that outer walls 26, 27 and camber line ribs 62 may be formed using any now known or later developed technique, e.g., via casting or additive manufacturing as integral components.

The second type of rib is referred to herein as a transverse rib 66. Transverse ribs 66 are the shorter ribs that are shown connecting the walls and inner ribs of the four-wall configuration. As indicated, the four walls may be connected by a number of transverse ribs 66, which may be further classified according to which of the walls each connects. As used herein, traverse ribs 66 that connect pressure side outer wall 26 to pressure side camber line rib 63 are referred to as pressure side traverse ribs 67. Transverse ribs 66 that connect suction side outer wall 27 to suction side camber line rib 64 are referred to as suction side traverse ribs 68. Transverse ribs 66 that connect pressure side camber line rib 63 to suction side camber line rib 64 are referred to as center traverse ribs 69. Finally, a transverse rib 66 that connects pressure side outer wall 26 and suction side outer wall 27 near leading edge 28 is referred to as a leading edge transverse rib 70. Leading edge transverse rib 70, in FIGS. 5 and 6, also connects to a leading edge end of pressure side camber line rib 63 and a leading edge end of suction side camber line rib 64.

As leading edge transverse rib 70 couples pressure side outer wall 26 and suction side outer wall 27, it also forms passage 40 referred to herein as a leading edge passage 42. Leading edge passage 42 may have similar functionality as other passages 40, described herein.

In general, the purpose of any internal configuration in an airfoil 25 is to provide efficient near-wall cooling, in which the cooling air flows in channels adjacent to outer walls 26, 27 of airfoil 25. It will be appreciated that near-wall cooling is advantageous because the cooling air is in close proximity of the hot outer surfaces of the airfoil, and the resulting heat transfer coefficients are high due to the high flow velocity achieved by restricting the flow through narrow channels. However, such arrangements are prone to experiencing low cycle fatigue due to differing levels of thermal expansion experienced within airfoil 25, which, ultimately, may shorten the life of the rotor blade. For example, in operation, suction side outer wall 27 thermally expands more than suction side camber line rib 64. This differential expansion tends to increase the length of the camber line of airfoil 25, and, thereby, causes stress between each of these structures as well as those structures that connect them. In addition, pressure side outer wall 26 also thermally expands more than the cooler pressure side camber line rib 63. In this case, the differential tends to decrease the length of the camber line of airfoil 25, and, thereby, cause stress between each of these structures as well as those structures that connect them. The oppositional forces within the airfoil that, in the one case, tends to decrease the airfoil camber line and, in the other, increase it, can lead to stress concentrations. The various ways in which these forces manifest themselves given an airfoil's particular structural configuration and the manner in which the forces are then balanced and compensated for becomes a significant determiner of the part life of rotor blade 16.

More specifically, in a common scenario, suction side outer wall 27 tends to bow outward at the apex of its curvature as exposure to the high temperatures of the hot gas path cause it to thermally expand. It will be appreciated that suction side camber line rib 64, being an internal wall, does not experience the same level of thermal expansion and, therefore, does not have the same tendency to bow outward.

That is, camber line rib 64 and transverse ribs 66 and their connection points resists the thermal growth of the outer wall 27.

Conventional arrangements, an example of which is shown in FIG. 5, have camber line ribs 62 formed with stiff geometries that provide little or no compliance. The resistance and the stress concentrations that result from it can be substantial. Exacerbating the problem, traverse ribs 66 used to connect camber line rib 62 to outer wall 27 may be formed with linear profiles and generally oriented at right angles in relation to the walls that they connect. This being the case, traverse ribs 66 operated to basically hold fast the "cold" spatial relationship between the outer wall 27 and the camber line rib 64 as the heated structures expand at significantly different rates. The little or no "give" situation prevents defusing the stress that concentrates in certain regions of the structure. The differential thermal expansion results in low cycle fatigue issues that shorten component life.

Many different internal airfoil cooling systems and structural configurations have been evaluated in the past, and attempts have been made to rectify this issue. One such approach proposes overcooling outer walls 26, 27 so that the temperature differential and, thereby, the thermal growth differential are reduced. It will be appreciated, though, that the way in which this is typically accomplished is to increase the amount of coolant circulated through the airfoil. Because coolant is typically air bled from the compressor, its increased usage has a negative impact on the efficiency of the engine and, thus, is a solution that is preferably avoided. Other solutions have proposed the use of improved fabrication methods and/or more intricate internal cooling configurations that use the same amount of coolant, but use it more efficiently. While these solutions have proven somewhat effective, each brings additional cost to either the operation of the engine or the manufacture of the part, and does nothing to directly address the root problem, which is the geometrical deficiencies of conventional arrangement in light of how airfoils grow thermally during operation. As shown in one example in FIG. 6, another approach employs certain curving or bubbled or sinusoidal or wavy internal ribs (hereinafter "wavy ribs") that alleviate imbalanced thermal stresses that often occur in the airfoil of turbine blades. These structures reduce the stiffness of the internal structure of airfoil 25 so to provide targeted flexibility by which stress concentrations are dispersed and strain off-loaded to other structural regions that are better able to withstand it. This may include, for example, off-loading stress to a region that spreads the strain over a larger area, or, perhaps, structure that offloads tensile stress for a compressive load, which is typically more preferable. In this manner, life-shortening stress concentrations and strain may be avoided.

However, despite the above arrangements, a high stress area may still result at leading edge transverse rib 70 connection points 80 to camber line ribs 63 and 64, e.g., because camber line ribs 63, 64 load path reacts at connection points 80 where insufficient cooling occurs FIGS. 7-10 provide cross-sectional views of a turbine rotor blade 16 having an inner wall or rib configuration according to embodiments of the present disclosure. Configuration of ribs that are typically used as both structural support as well as partitions that divide hollow airfoils 25 into substantially separated radially extending flow passages 40 that may be interconnects as desired to create cooling circuits. These flow passages 40 and the circuits they form are used to direct a flow of coolant through the airfoil 25 in a particular manner so that its usage is targeted and more efficient. Though the examples provided herein are shown as they might be used in a turbine rotor blades 16, it will be appreciated that the same concepts also may be employed in turbine stator blades 17 (vanes).

Specifically, as will be described relative to FIGS. 7-10, the present disclosure teaches positioning at least one camber line rib 63, 64 to connect to pressure side outer wall 26 and/or suction side outer wall 27 at a point aft of leading edge transverse rib 70 causing central passage 46 to extend towards pressure side outer wall 26 and/or suction side outer wall 27. In this fashion, central passage 46 flares outwardly toward at least one of outer walls 26, 27, relieving stress in connection points 80 and other adjacent structure to leading edge transverse rib 70. To affect this change, turbine rotor blade 16 includes a rib configuration including a leading edge transverse rib 70 connecting pressure side outer wall 26 and suction side outer wall 27 and partitioning the radially extending chamber into a leading edge passage 42 within leading edge 28 of airfoil 25 and a central passage 46 adjacent to leading edge passage 42. Central passage 46 is 'central' because it is within or surrounded by other passages, e.g., 48, 50, formed between camber line ribs 63, 64 and outer walls 26, 27, respectively. For example, pressure side outer wall 26 and pressure side camber line rib 63 define a pressure side flow passage 48 therebetween and suction side outer wall 27 and suction side camber line rib 64 define a suction side flow passage 50 therebetween.

Figure 7:
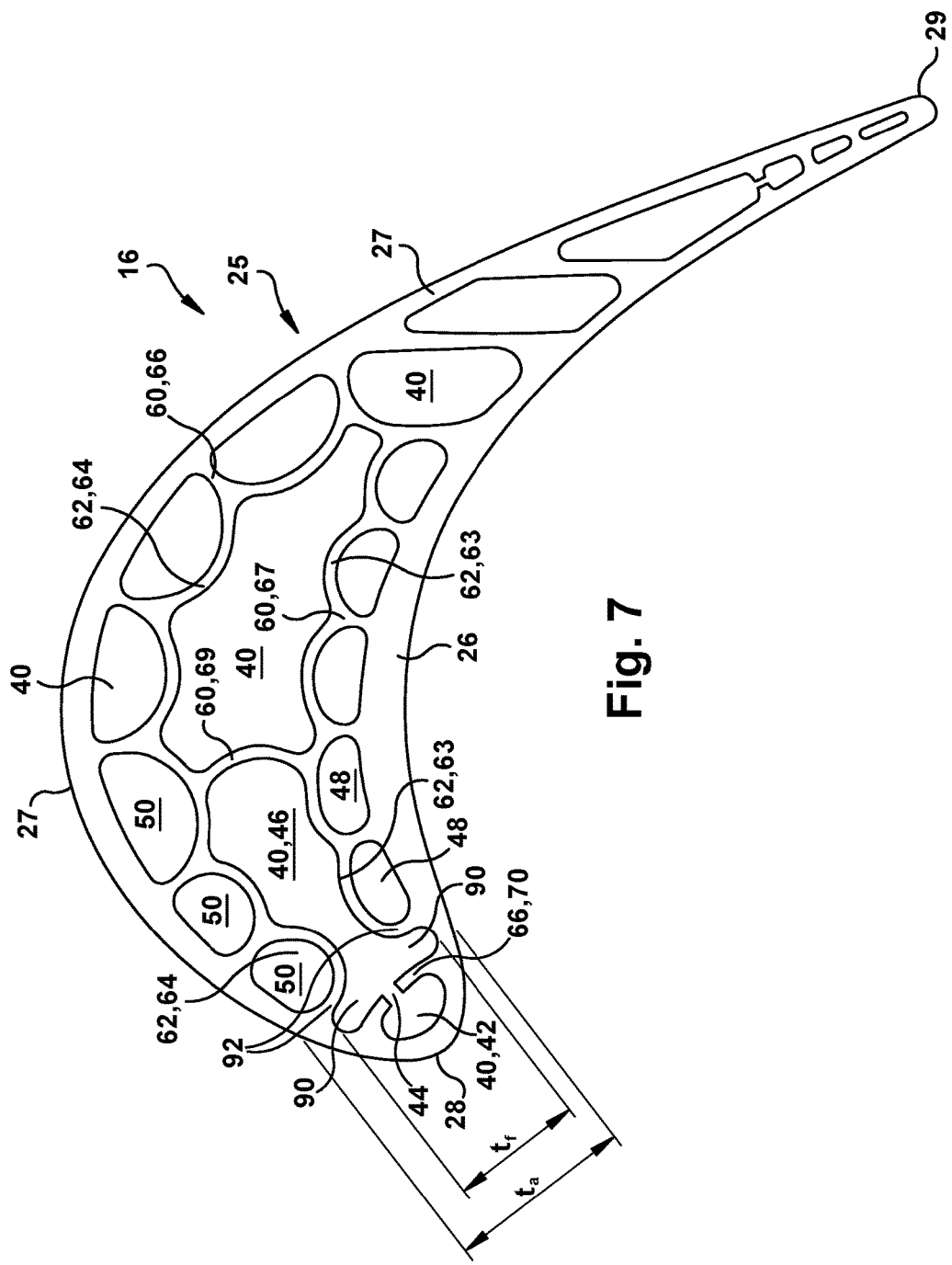
FIG. 7 is a cross-sectional view of a turbine rotor blade having a flared central passage configuration according to an alternative embodiment of the present disclosure.
Figure 9:
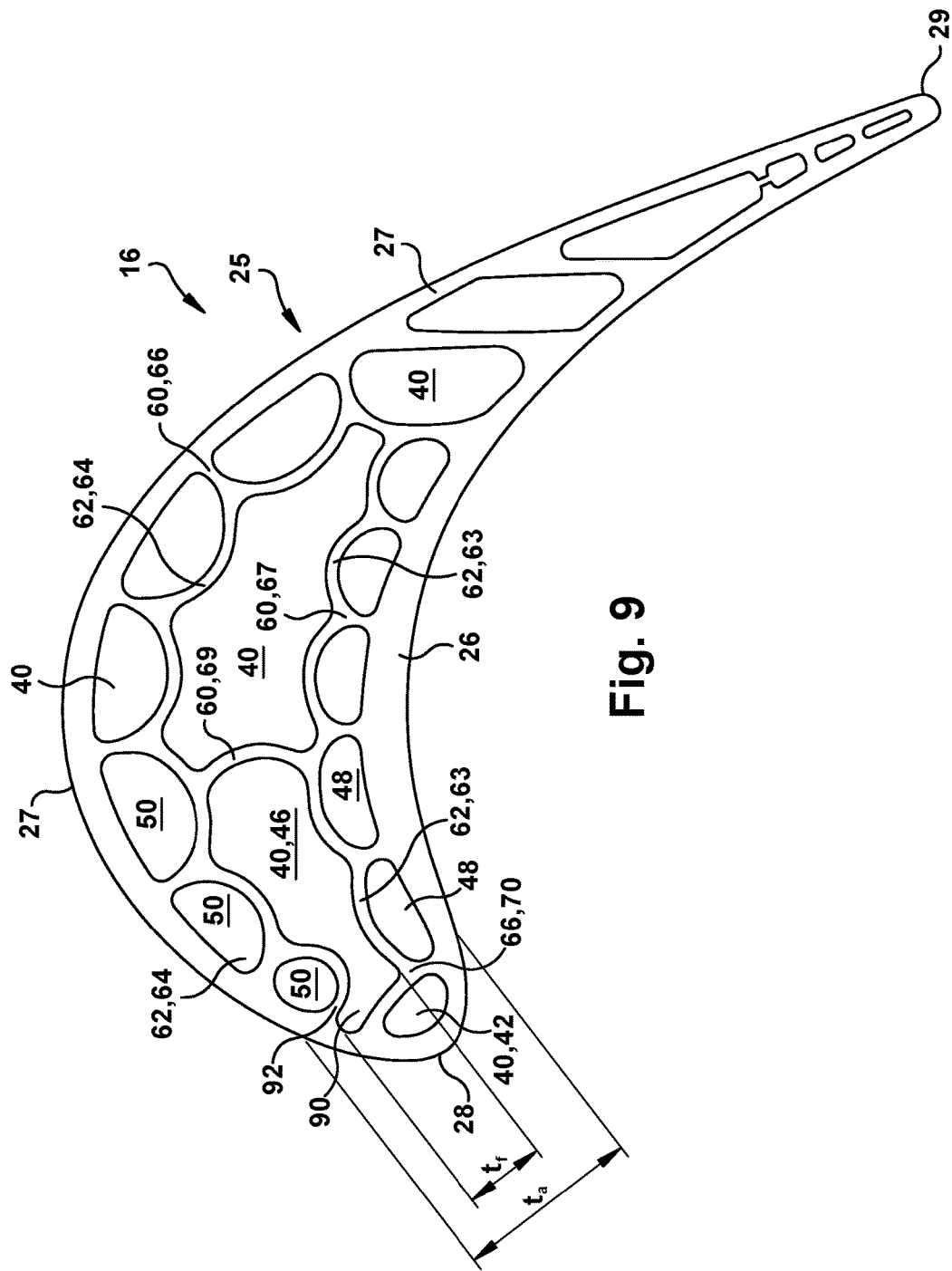
FIG. 9 is a cross-sectional view of a turbine rotor blade having a flared central passage configuration according to an alternative embodiment of the present disclosure.

As illustrated, as an option, crossover passage(s) 44 may be provided within leading edge transverse rib 70 to allow coolant to flow between leading edge passage 42 and immediately aft and adjacent central passage 46. More specifically, as illustrated in FIG. 7, according to embodiments, a crossover passage 44 may allow coolant to pass to and/or from leading edge passage 42 to immediately aft central passage 46. Cross-over port 44 may include any number thereof positioned in a radially spaced relation between passages 40, 42. The stress described herein that is created by camber line ribs 62, 63, 64 at points 80 (FIGS. 5 and 6) may be more intense where crossover passages 44 are employed between leading edge passage 42 and immediately aft central passage 46. In particular, where cross-over passages 44 are provided, camber line ribs 62, 63, 64 load path may react on connection points 80 (FIGS. 5 and 6) where crossover passages 44 would be located, causing higher stress. Crossover passage(s) 44 are not necessary in all embodiments, e.g., although applicable to the embodiment shown therein, FIG. 9 shows an example without crossover passage(s) 44. Where crossover passage(s) 44 are provided, however, the teachings of the disclosure relieve stress adjacent thereto in leading edge transverse rib 70 and adjacent structure.

The rib configuration also includes a camber line rib 63, 64 connecting to a selected one of the pressure side outer wall 26 and the suction side outer wall 27 at a point 92 aft of leading edge transverse rib 70 causing central passage 46 to extend towards the selected one of pressure side outer wall 26 and suction side outer wall 27. A camber line rib 62, as described above, is one of the longer ribs that typically extend from a position near leading edge 28 of airfoil 25 toward trailing edge 29. These ribs are referred to as "camber line ribs" because the path they trace is approximately parallel to the camber line of airfoil 25, which is a reference line extending between leading edge 28 and trailing edge 29 of airfoil 25 through a collection of points that are equidistant between concave pressure side outer wall 26 and convex suction side outer wall 27. As shown, the rib configuration according to embodiments of the disclosure forms a flared portion 90 that flares towards outer wall(s) 26, 27 in central cavity 46. Since more coolant is flowing near leading edge transverse rib 70 and crossover passage(s) 44 (where provided), the stress therein is reduced.

Figure 8:
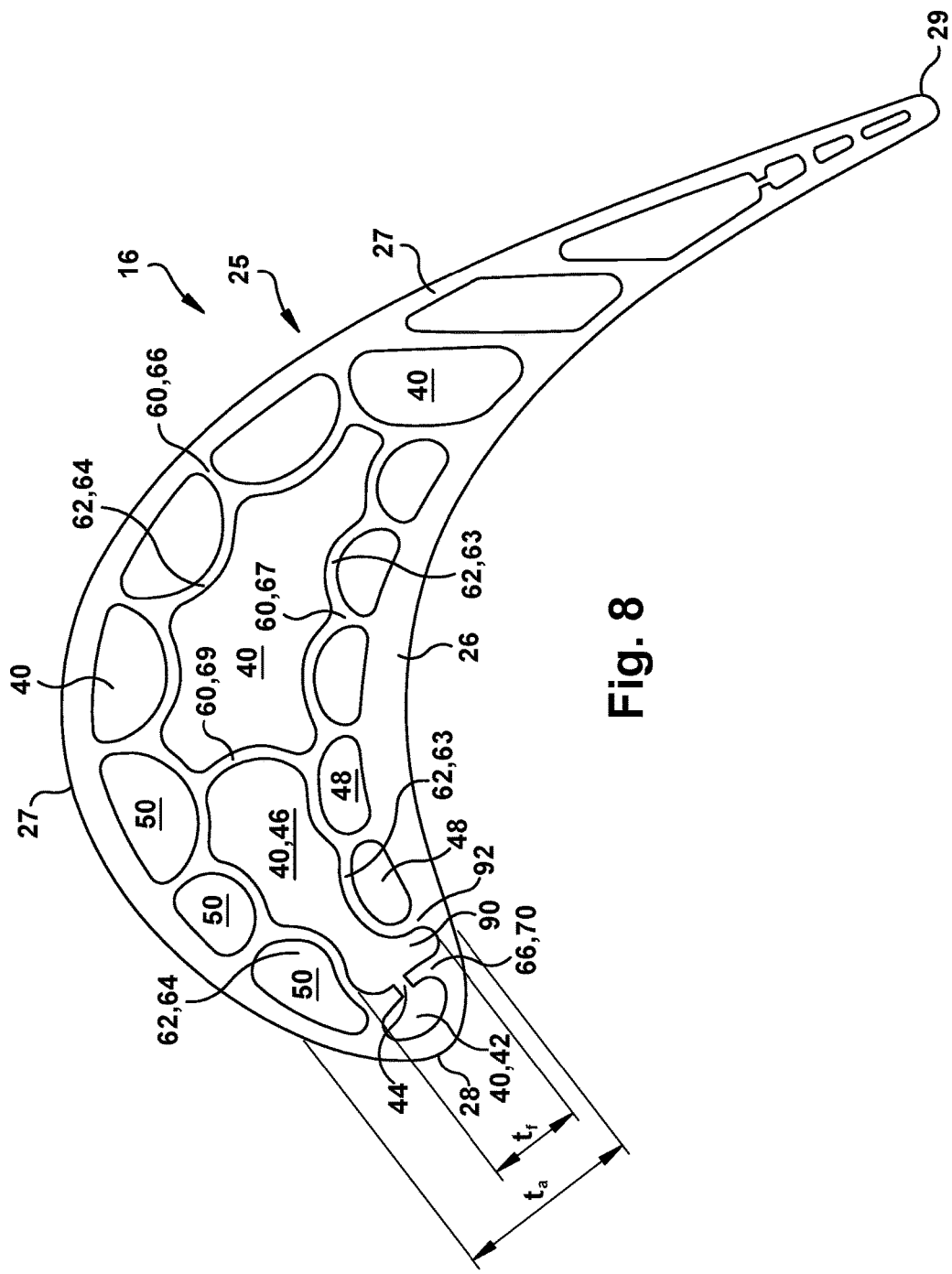
FIG. 8 is a cross-sectional view of a turbine rotor blade having a flared central passage configuration according to an alternative embodiment of the present disclosure.

In one embodiment, shown in FIGS. 7-9, the rib configuration of the present disclosure includes camber line rib 62 having a wavy profile, as described in US Patent Publication 2015/0184519, which is hereby incorporated by reference. (As used herein, the term "profile" is intended to refer to the shape the ribs have in the cross-sectional views of FIGS. 7-10.) According to the present application, a "wavy profile" includes one that is noticeably curved and sinusoidal in shape, as indicated. In other words, the "wavy profile" is one that presents a back-and-forth "S" profile. In another embodiment, as shown in FIG. 10, the rib configuration of the present disclosure may include camber line ribs 63, 64 having a non-wavy profile.

With further reference to FIG. 7, according to one embodiment, both pressure side camber line 63 and suction side camber line 64 connect to a respective outer wall 26, 27, i.e., the selected one outer wall includes both (two) outer walls. That is, pressure side camber line rib 63 residing near pressure side outer wall 26 connects to pressure side outer wall 26 at a point 92 aft of leading edge transverse rib 70. This rib configuration causes central passage 46 to extend towards pressure side outer wall 26 with a first flared region 90. Further, suction side camber line rib 64 residing near suction side outer wall 27 connects to suction side outer wall 27 at a point 92 aft of leading edge transverse rib 70. This rib arrangement causes central passage 46 to extend towards suction side outer wall 27 with a second flared region 90. As illustrated, flared regions 90 include rounded interiors. In one embodiment, at a location where central passage 46 extends towards outer walls 26, 27, i.e., where flared regions 90 are present, a width $t_f$ is defined between outermost extents of flared regions 90 (FIG. 7). At the same location (i.e., cross-sectional line as width $t_f$ is measured), a width between outer surfaces of outer walls 26, 27 may be defined as $t_a$. A ratio of width $t_f$ to width $t_a$ ($t_f/t_a$) may range from 40-70%, depending on desired configuration and embodiment of flared regions 90 employed. In an alternative embodiment, flared regions 90 may have an outermost extent that is in line with an outermost extent of adjacent passages 48, 50 relative to outer walls 26, 27, i.e., outer walls 26, 27 have a thickness relative to respective flared regions 90 that is equal to or nearly equal to the thickness thereof relative to corresponding adjacent passages 48, 50. In either of these embodiments, both leading edge transverse rib 70 and pressure side camber line rib 63 connect to pressure side outer wall 26 in a spaced manner, and both leading edge transverse rib 70 and suction side camber line rib 64 connect to suction side outer wall 27 in a spaced manner.

In contrast, in alternative embodiments shown in FIGS. 8 and 9, only a selected one of the camber line ribs 63, 64 connects to a respective outer wall 26, 27. In FIG. 8, camber line rib 62 includes pressure side camber line rib 63 connected to pressure side outer wall 26 at point 92 aft of leading edge transverse rib 70 causing central passage 46 to extend towards pressure side outer wall 26. Here, leading edge transverse rib 70 and pressure side camber line rib 63 connect to pressure side outer wall 26 in a spaced manner, but leading edge transverse rib 70 and suction side camber line rib 64 connect to one another. Only one flared region 90 is present in this embodiment. In contrast, in FIG. 9, camber line rib 62 includes suction side camber line rib 64 connected to suction side outer wall 27 at a point 92 aft of leading edge transverse rib 70 causing central passage 46 to extend towards suction side outer wall 27. In this embodiment, leading edge transverse rib 70 and suction side camber line rib 64 connect to suction side outer wall 27 in a spaced manner, but leading edge transverse rib 70 and pressure side camber line rib 63 connect to one another. Again, only one flared region 90 is present here. Here again, flared regions 90 include rounded interiors. Further, in one embodiment, flared regions 90 may have a width $t_f$ from an outermost extent of one flared region 90 to an inner extent of central chamber 46. At the same cross-sectional line as width $t_f$ is measured, a width of outer walls 26, 27 (outer surfaces thereof) may be denoted $t_a$. A ratio of width $t_f$ to width $t_a$ ($t_f/t_a$) may range from 40-70%, depending on desired configuration and embodiment of flared regions 90 employed. In an alternative embodiment, flared regions 90 may have an outermost extent that is in line with an outermost extent of adjacent passages 48, 50 relative to outer walls 26, 27, i.e., outer walls 26, 27 have a thickness relative to respective flared regions 90 that is equal to or nearly equal to the thickness thereof relative to corresponding adjacent passages 48, 50. On a side that does not include flared regions 90, the adjacent passage 48 or 50 can be extended more toward transverse rib 70, compared to those shown in FIGS. 5 and 6. That is, adjacent passage 48 or 50 is extended forwardly such that transverse rib 70 and an end of a respective camber line rib 63 or 64 coupling to outer wall 26 or 27 collectively have a thickness equal to or nearly equal to that of other ribs 60, 62, 63, etc.—in contrast to thicker transverse ribs 63, 70 or 64, 70 shown FIGS. 5 and 6.

Figure 10:
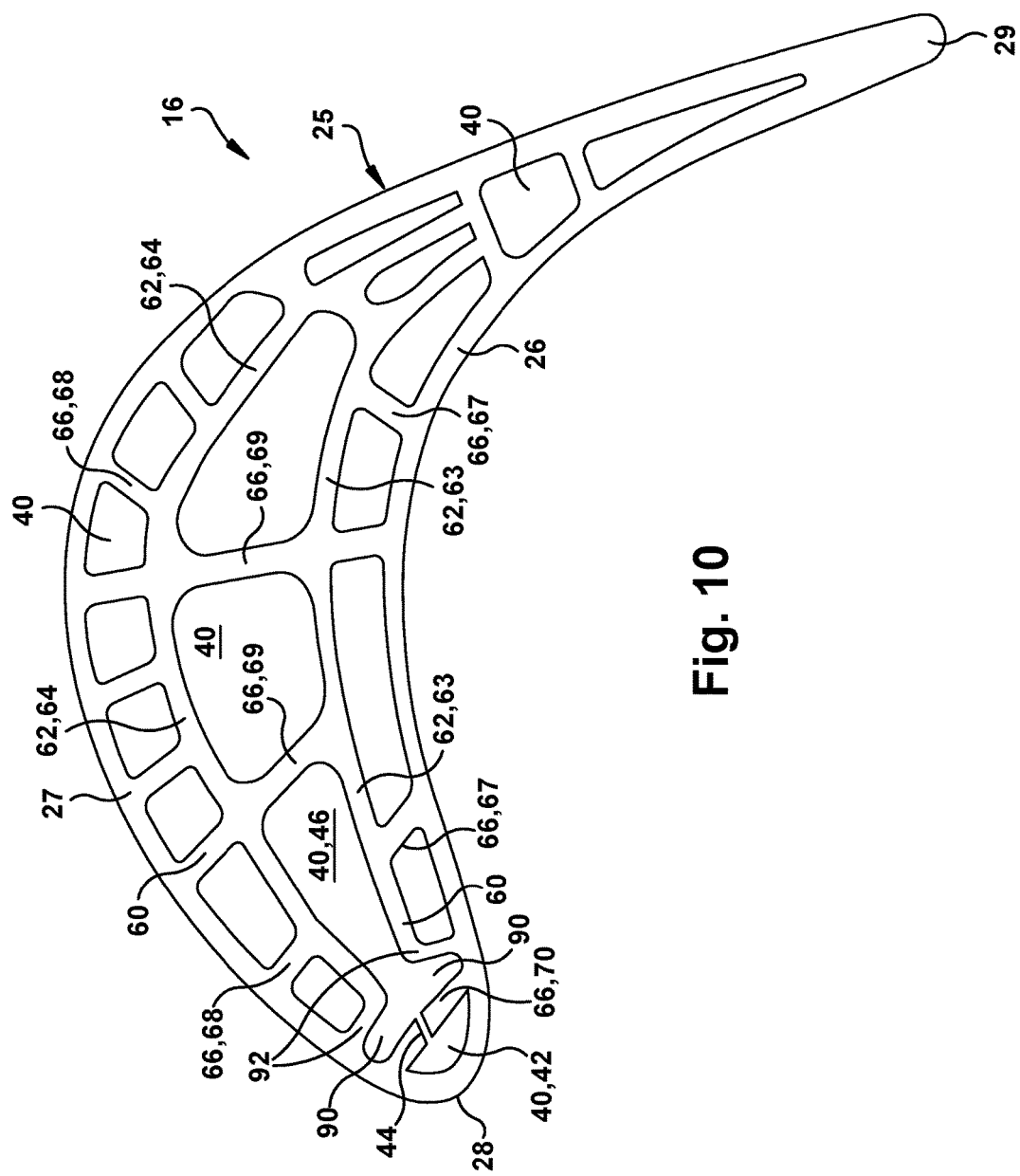
FIG. 10 is a cross-sectional view of a turbine rotor blade having a flared central passage without a wavy profile as in FIGS. 7-9, according to an alternative embodiment of the present disclosure.

FIG. 10 shows an alternative embodiment, similar to FIG. 7, except that it does not employ a wavy profile. It is emphasized that the teachings of FIGS. 8 and 9 may also be employed to rib configurations having a non-wavy profile. Further, the teachings of the disclosure may be applied to a wide variety of rib configurations having leading edge passage 42 and immediately aft central passage 46, as described herein.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/-10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A blade comprising an airfoil defined by a concave pressure side outer wall and a convex suction side outer wall that connect along leading and trailing edges and, therebetween, form a radially extending chamber for receiving a flow of a coolant, the blade further comprising:
   a rib configuration including:
   a leading edge transverse rib connecting the pressure side outer wall and the suction side outer wall and partitioning the radially extending chamber into a leading edge passage within the leading edge of the airfoil and a central passage adjacent to the leading edge passage; and
   a camber line rib connecting to a selected one of the pressure side outer wall or the suction side outer wall at a point aft of the leading edge transverse rib causing the central passage to extend towards the selected one of the pressure side outer wall or the suction side outer wall;
   wherein the camber line rib includes:
   a pressure side camber line rib residing near the pressure side outer wall and connected to the pressure side outer wall at a point aft of the leading edge transverse rib causing the central passage to extend towards the pressure side outer wall, the pressure side camber line rib extending radially so to connect with the pressure side outer wall along at least a majority of a radial height of the airfoil, wherein a leading end of the pressure side camber line rib connects directly to the pressure side outer wall; and
   a suction side camber line rib residing near the suction side outer wall and connected to the suction side outer wall at a point aft of the leading edge transverse rib causing the central passage to extend towards the suction side outer wall, the suction side camber line rib extending radially so to connect with the suction side outer wall along at least a majority of the radial height of the airfoil, wherein a leading end of the suction side camber line rib connects directly to the suction side outer wall;
   wherein, at a location where the central passage extends towards the suction side outer wall and the pressure side outer wall, a width $t_f$ is defined between outermost extents of the central passage and a width $t_a$ is defined between outer surfaces of the suction side outer wall and the pressure side outer wall, and wherein a ratio of the width $t_f$ to the width $t_a$ ranges from 40% to 70%.

2. The blade of claim 1, wherein the pressure side outer wall and the pressure side camber line rib define a pressure side flow passage therebetween, and wherein the suction side outer wall and the suction side camber line rib define a suction side flow passage therebetween.

3. The blade of claim 1, wherein the leading edge transverse rib includes a crossover passage between the leading edge passage and the central passage.

4. The blade of claim 1, wherein the camber line rib has a wavy profile.

5. The blade of claim 1, wherein the blade comprises one of a turbine rotor blade or a turbine stator blade.

6. A turbine rotor blade comprising an airfoil defined by a concave pressure side outer wall and a convex suction side outer wall that connect along leading and trailing edges and, therebetween, form a radially extending chamber for receiving the flow of a coolant, the turbine rotor blade further comprising:
   a rib configuration including:
   a leading edge transverse rib connecting the pressure side outer wall and the suction side outer wall and partitioning the radially extending chamber into a leading edge passage within the leading edge of the airfoil and a central passage adjacent to the leading edge passage; and
   a camber line rib connecting to a selected one of the pressure side outer wall or the suction side outer wall at a point aft of the leading edge transverse rib causing the central passage to extend towards the selected one of the pressure side outer wall or the suction side outer wall;
   wherein the camber line rib includes:
   a pressure side camber line rib residing near the pressure side outer wall and connected to the pressure side outer wall at a point aft of the leading edge transverse rib causing the central passage to extend towards the pressure side outer wall, the pressure side camber line rib extending radially so to connect with the pressure side outer wall along at least a majority of a radial height of the airfoil, wherein a leading end of the pressure side camber line rib connects directly to the pressure side outer wall; and
   a suction side camber line rib residing near the suction side outer wall and connected to the suction side outer wall at a point aft of the leading edge transverse rib causing the central passage to extend towards the suction side outer wall, the suction side camber line rib extending radially so to connect with the suction side outer wall along at least a majority of the radial height of the airfoil, wherein a leading end of the suction side camber line rib connects directly to the suction side outer wall;
   wherein, at a location where the central passage extends towards the suction side outer wall and the pressure side outer wall, a width $t_f$ is defined between outermost extents of the central passage and a width $t_a$ is defined between outer surfaces of the suction side outer wall and the pressure side outer wall, and wherein a ratio of the width $t_f$ to the width $t_a$ ranges from 40% to 70%.

7. The turbine rotor blade of claim 6, wherein the pressure side outer wall and the pressure side camber line rib define a pressure side flow passage therebetween, and wherein the suction side outer wall and the suction side camber line rib define a suction side flow passage therebetween.

8. The turbine rotor blade of claim 6, wherein the leading edge transverse rib includes a crossover passage between the leading edge passage and the central passage.

9. The turbine rotor blade of claim 6, wherein the camber line rib has a wavy profile.

\* \* \* \* \*